United States Patent
Laas et al.

(10) Patent No.: US 6,423,777 B1
(45) Date of Patent: *Jul. 23, 2002

(54) POWDER COATING CROSS-LINKING AGENTS OF HIGH FUNCTIONALITY WHICH CONTAIN URETDIONE GROUPS AND FREE ISOCYANATE GROUPS

(75) Inventors: Hans-Josef Laas, Köln; Ulrich Freudenberg, Pulheim; Reinhard Halpaap, Odenthal; Michael Grahl, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 20 days.

This patent is subject to a terminal disclaimer.

(21) Appl. No.: 09/655,526

(22) Filed: Sep. 5, 2000

(30) Foreign Application Priority Data

Sep. 9, 1999 (DE) .......................... 199 43 034

(51) Int. Cl.$^7$ ...................... C09D 175/04; C08G 18/42; C08G 18/79
(52) U.S. Cl. ................. 525/127; 525/124; 525/440; 525/458; 528/45; 528/60; 528/65; 528/66; 528/93
(58) Field of Search .............. 528/45, 60, 65, 528/66, 73; 525/124, 127, 440, 458

(56) References Cited

U.S. PATENT DOCUMENTS

| | | | |
|---|---|---|---|
| 4,288,586 A | 9/1981 | Book et al. ............... 528/67 |
| 4,413,079 A | 11/1983 | Disteldorf et al. .......... 524/169 |
| 4,463,154 A | 7/1984 | Disteldorf et al. ............ 528/45 |
| 4,476,054 A | 10/1984 | Disteldorf et al. ...... 260/239 A |
| 4,522,975 A | 6/1985 | O'Connor et al. .......... 524/702 |
| 4,837,359 A | 6/1989 | Woynar et al. ............. 560/335 |
| 4,994,541 A | 2/1991 | Dell et al. .................... 528/51 |
| 5,596,066 A | 1/1997 | Laas et al. .................... 528/73 |
| 5,621,064 A | 4/1997 | Laas et al. .................... 528/60 |
| 5,773,550 A | 6/1998 | Wolf ........................... 528/59 |
| 5,795,950 A | 8/1998 | Sugimoto et al. ............. 528/73 |
| 5,847,044 A | 12/1998 | Laas et al. .................. 524/590 |
| 6,043,332 A | 3/2000 | Laas et al. .................... 528/51 |
| 6,297,343 B1 * | 10/2001 | Laas ........................... 528/45 |

FOREIGN PATENT DOCUMENTS

| | | |
|---|---|---|
| CA | 1335990 | 6/1995 |
| CA | 2143380 | 8/1995 |
| CA | 2186715 | 6/1997 |
| CA | 2213056 | 2/1998 |
| EP | 669354 | 5/2000 |

* cited by examiner

Primary Examiner—Patricia A. Short
(74) Attorney, Agent, or Firm—Joseph C. Gil; Thomas W. Roy

(57) ABSTRACT

The invention relates to new high-functional polyaddition compounds which contain free isocyanate groups with an average isocyanate functionality of 2.1 to 8.0, a concentration of uretdione of 10 to 18 wt. %, a concentration of urethane of 10 to 20 wt. % and a concentration of ester groups —CO—O and/or carbonate groups —O—CO—O of 1 to 17 wt. %, a process for the preparation thereof and their use as starting components for the preparation of polyurethane plastics, in particular as cross-linking agents for heat-curable powder coatings.

6 Claims, No Drawings

POWDER COATING CROSS-LINKING AGENTS OF HIGH FUNCTIONALITY WHICH CONTAIN URETDIONE GROUPS AND FREE ISOCYANATE GROUPS

BACKGROUND OF THE INVENTION

1. Field of the Invention

The invention relates to high-functional polyaddition compounds which contain uretdione groups, a process for the preparation thereof and their use as starting components for the preparation of polyurethane plastics, in particular as cross-linking agents for heat-curable powder coatings.

2. Description of the Prior Art

Polyaddition compounds, which contain uretdione groups, are being used increasingly as blocking agent-free cross-linking agents for highly weather-resistant polyurethane (PUR) powder coatings. Their cross-linking principle is the thermal splitting of the uretdione structure to give free isocyanate groups again followed by reaction with a hydroxy-functional binder.

Although uretdione powder coating cross-linking agents have been known for a long time, they have not penetrated the market in a decisive manner. Reasons are, inter alia, the relatively low isocyanate content of the currently available commercial products and, their low average functionality which is frequently less than 2.0. For a high durability of lacquers and coatings, however, cross-linking components with a high NCO content and as high as possible a functionality, at least 2.0, are required.

EP-A 45 994 describes reaction products of a linear, difunctional IPDI uretdione and excess amounts of diols as blocking agent-free powder coating cross-linking agents.

These polyaddition products may have up to 8 wt. % of unblocked free isocyanate groups in terminal positions and a high total isocyanate content (sum of the isocyanate groups which are present as free groups and in the form of uretdione internally blocked groups). But they only have a functionality of 2.0 and it is difficult to prepare them, in particular on an industrial scale.

Since the cleaving of thermally labile uretdione structures in the presence of hydroxy-functional reaction partners takes place to a marked extent at 100° C., this temperature must not be exceeded, if possible, during the synthesis of uretdione group-containing polyaddition compounds. However, in this temperature range, the products described in EP-A 45 994 have such a high melt viscosity that the ability to produce them in the molten state is limited due to the inability to stir them on an industrial scale. These uretdione cross-linking agents can only be prepared on a large scale dissolved in solvents, which are inert towards isocyanates. This solvent has to be removed in an additional process step. A solvent-free method of preparation for the polyaddition compounds of EP-A 669 354 requires special reaction screws or extruders under the effect of high shear forces and is costly.

The main disadvantage of the polyaddition products described in EP-A 45 994, however, is the relatively large number of unblocked, free isocyanate groups which can react with the hydroxy-functional binder during the production of powder coatings, normally performed by melt extrusion at about 100° C. These types of pre-cross-linked powder coatings exhibit such unfavorable rheological behavior during the stoving process that they cure to give coatings with only moderate optical properties, in particular completely inadequate flow properties.

The problem of undesired pre-cross-linking exists in principal for all PUR powder coating hardeners, which have a high content of free isocyanate groups. For example, in the case of the blocking agent-free powder coating cross-linking agents made from IPDI uretdione and simple diols, described in EP-A 45 996 and EP-A 45 998, at least some of the terminal free isocyanate groups are reacted with monoamines or monoalcohols. Although the problematic preliminary reaction in the extruder can be suppressed in this way, chain termination with a monofunctional compound clearly reduces the total isocyanate content, simultaneously lowering the average functionality to a value below 2.0. In addition, the products in these two publications also still have such a high fluid viscosity in the region of the temperature at which uretdione groups break apart that they,can be prepared reliably and reproducibly only in solution or by the costly process described in EP-A 669 354.

The preparation of uretdione powder coating cross-linking agents using ester or carbonate group-containing chain lengtheners is the object of EP-A 639 598. The products obtainable by this process have such low fluid viscosities at temperatures only slightly above their melting point that solvent-free production in simple stirred apparatus is possible for the first time. The uretdione cross-linking agents described in EP-A 720 994, in which dimeric diols are used for lengthening the chain, also have a sufficiently low fluid viscosity for solvent-free preparation. However, due to the relatively high molecular weights of the chain lengtheners used, the products in both publications still have lower total isocyanate contents than those in EP-A 45 996.

According to the disclosure in EP-A 669 353, uretdione-containing polyurethanes with terminal hydroxyl groups and an average functionality of 2.0 can be prepared by the solvent-free reaction of linear IPDI dimers and molar excess amounts of diols and/or polyesterdiols in special intensive compounders. The co-use of at least trifunctional polyols and/or branched polyesterpolyols, as demonstrated in EP-A 825 214 and EP-A 780 417, enables the preparation of OH-terminated uretdione cross-linking agents with functionalities between 2 and 3 or ≧3. The advantage of the high functionality of these polyaddition compounds, however, is counteracted by the disadvantage that, under stoving conditions, the hydroxyl groups present in the cross-linking molecules also react and form urethane groups, thus greatly reducing the internally blocked NCO content available for cross-linking the binder.

EP-A 760 380 discloses uretdione powder coating cross-linking agents with high latent NCO contents which are based on optionally isocyanurate group-containing HDI dimers. As described on page 5, lines 28 to 30 and page 7, lines 7 to 9 of this publication, however, products with too high an isocyanurate content or degree of branching lead to coatings with poor optical and mechanical properties. When preparing polyuretdione hardeners according to EP-A 760 380, therefore, branched, isocyanurate-containing starting polyisocyanates are generally extensively "linearized" by the co-use of monofunctional structural components.

Uretdione and isocyanurate group-containing polyaddition products of an IPDI dimer prepared by trialkylphosphine catalysis, diols and/or di-secondary amines as chain lengtheners and optionally monoalcohols or monoamines are the object of EP-A 790 266. These products can have relatively high proportions of free isocyanate groups, and thus a high total isocyanate content, in addition to high functionality, but they are prepared exclusively in organic solution due to the highly branched starting polyisocyanate.

So far no uretdione powder coating cross-linking agent has been proposed which satisfies all the practical requirements, in particular the high total content of isocyanate groups along with as high as possible a cross-linking functionality, and is also readily obtainable in a simple process.

One object of the present invention, therefore, is to provide uretdione group-containing PUR powder coating cross-linking agents, which do not have the disadvantages of the prior art described above.

This objects can be achieved by the polyaddition compounds according to the invention and the process for preparing these described in detail below. The invention is based on the surprising observation that, by reacting branched uretdione and isocyanurate group-containing polyisocyanate mixtures with a molar excess amount of ester and/or carbonate group-containing polyols in a solvent-free process in simple equipment, compounds suitable for use as powder coating cross-linking agents can be prepared. In combination with commercially available powder coating binders, despite a high content of free isocyanate groups and despite a high functionality, coatings are obtained which have outstanding flow properties and very high gloss. Among other reasons this was surprising because, according to the disclosure in EP-A 639 598, it was assumed that such ester and/or carbonate group-containing polyaddition compounds are suitable for use as powder coating cross-linking agents only up to concentration of free isocyanate groups of at most 2.0 wt. %. It is also pointed out in EP-A 760 380 (p. 7, lines 34 to 40), that products with too high a concentration of unblocked isocyanate groups lead to coatings with unsatisfactory optical properties due to unavoidable preliminary cross-linking in the extruder.

EP-A 669 354 mentions neopentylglycol hydroxypivalate among a large number of diols as a suitable starting compound for the solvent-free preparation of uretdione group-containing polyaddition compounds in intensive compounders. However, a person skilled in the art cannot obtain concrete evidence from this publication that branched uretdione group-containing polyisocyanate mixtures can also react in the molten state with ester and/or carbonate group-containing polyols to give uretdione powder coating cross-linking agents with very high total isocyanate contents in a simple stirred apparatus and, despite a considerable proportion of free isocyanate groups and a high functionality, produce lacquer films of outstanding quality with conventional polyesterpolyols. Rather, it can be shown that branched uretdione group-containing powder coating cross-linking agents with free isocyanate groups, prepared with the exclusive use of neopentylglycol hydroxypivalate as an ester group-containing chain lengthening agent lead to coatings with considerable surface defects, in particular a pronounced orange peel effect.

SUMMARY OF THE INVENTION

The present invention relates to a polyaddition compound which is solid below 40° C. and liquid above 125° C. and has
a) a concentration of free isocyanate groups (calculated as NCO; molecular weight=42) of 2.1 to 6.0 wt. % and an average isocyanate functionality of 2.1 to 8.0,
b) a concentration of uretdione groups (calculated as $C_2N_2O_2$; molecular weight=84) of 10 to 18 wt. %,
c) a concentration of urethane groups (calculated as —NH—CO—O; molecular weight=59) of 10 to 20 wt. % and
d) a concentration of ester groups —CO—O (calculated as —CO—O; molecular weight=44) and/or carbonate groups —O—CO—O (calculated as —CO—O; molecular weight=44) of 1 to 17 wt. % wherein the uretdione groups are not derived from pure 1-isocyanato-3,3,5-trimethyl-5-isocyantomethylcyclohexane by trialkylphosphine catalysis, and the ester and/or carbonate groups are not derived from neopentylglycol hydroxypivalate.

The invention also provides a process for preparing uretdione group-containing polyaddition compounds by reacting
  A) uretdione group-containing polyisocyanate mixtures with an average NCO functionality of at least 2.1, except for derivatives of pure 1-isocyanato-3,3,5-trimethyl-5-isocyantomethylcyclohexane prepared by trialkylphosphine catalysis, and
  B) up to 10 wt. %, based on the total weight of components A) and B), of diisocyanates other than A) with
  C) ester and/or carbonate group-containing polyhydroxyl compounds with an number-average molecular weight of 134 to 2000, except for neopentylglycol hydroxypivalate, and
  D) of up to 70 wt. %, based on the total weight of components C) and D) of ester and carbonate group-free polyhydroxyl compounds with a molecular weight of 62–400, and
  E) up to 20 wt. %, with respect to the total weight of components C), D) and E), of monofunctional isocyanate-reactive compounds,
at an equivalent ratio of isocyanate groups to isocyanate-reactive groups of 1.2:1 to 1.8:1, wherein the ratios by weight of the starting materials mentioned are chosen such that the resulting products correspond to the conditions mentioned under a) to d) above.

The invention also relates to the use of these polyaddition compounds as starting components for the preparation of polyurethane plastics and as cross-linking components in heat-curable polyurethane powder coatings for coating heat-resistant substrates by the methods of powder coating technology.

DETAILED DESCRIPTION OF THE INVENTION

Starting compounds A) for the process according to the invention are uretdione group-containing polyisocyanate mixtures obtained from monomeric diisocyanates and having an average NCO functionality of 2.1 to 2.7.

Suitable diisocyanates for preparing these starting compounds A) are those with a molecular weight of 140 to 400 with aliphatically, cycloaliphatically, araliphatically and/or aromatically bonded isocyanate groups such as 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanato-cylcohexane, 1,3- and 1,4-bis-(isocyanatomethyl)-cyclohexane, 1,3-diisocyanato-2(4)-methylcyclohexane, 1-isocyanato-3,3,5-trimethyl-5-isocyanatomethyl-cyclohexane (isophorone diisocyanate; IPDI), 1-isocyanato-1-methyl-4(3)-isocyanatomethylcyclohexane, 4,4'-diisocyantodicyclohexylmethane, 1,3- and 1,4-phenylene diisocyanate, 1,3- and 1,4-bis-(isocyanatomethyl)-benzene, 2,4- and 2,6-toluylene diisocyanate and any mixture of these isomers, diphenylmethane-2,4' and/or -4,4'diisocyanate and naphthylene-1,5-diisocyanate and any mixtures of such diisocyanates.

Starting compounds A) have an average NCO functionality of at least 2.1. This implies that at least trifunctional polyisocyanate molecules and linear difunctional uretdione structures must be present. These trifunctional and higher functional constituents of starting compounds A) are known derivatives of diisocyanates with isocyanurate, allophanate, biuret, urethane and/or iminooxadiazinedione structures.

Starting compounds A) may be prepared by a number of known methods for the oligomerization of monomeric diisocyanates, such as those described, for example in J. Prakt. Chem. 336 (1994) 185–200, DE-As 16 70 666, 19 54 093, 24 14 413, 24 52 532, 26 41 380, 37 00 209, 39 00 053 and 39 28 503 or EP-As 336 205, 339 396 and 798 299.

One possibility for preparing suitable starting compounds A) is direct oligomerization of monomeric diisocyanates to give polyisocyanate mixtures which contain uretdione groups and higher functional structures in one step, e.g. by trialkylphosphine catalyzed dimerization and simultaneous trimerization to give uretdione and isocyanurate group-containing polyisocyanates (e.g. DE-A 1 934 763 or DE-A 3 900 053).

Suitable starting compounds A) can,also be obtained, however, by any multi-stage process in which uretdione production and modification to give higher functional structures are performed in any sequence. Examples of this type of reaction sequence include the catalytic dimerization of monomeric diisocyanates and subsequent reaction of the reaction mixture with alcohols to give uretdione and allophanate group-containing polyisocyanates as described in U.S, Pat. No. 5,461,135 or thermal dimerization with subsequent catalytic trimerization to give uretdione and isocyanurate group-containing polyisocyanates as described in WO 99/07765.

Suitable starting compounds A) can also be obtained, however, as physical mixtures of separately prepared uretdione group-containing polyisocyanates with any higher functional polyisocyanates, for example those containing isocyanurate, allophanate, biuret, urethane and/or iminooxadiazinedione groups. These mixtures are particularly suitable.

Any unreacted monomeric diisocyanate is generally removed from the mixtures used as starting compounds A) immediately after preparation monomeric by known methods, including thin layer distillation or extraction. Therefore, they generally have a residual concentration of monomeric diisocyanates of less than 5 wt. %, preferably less than 2 wt. % and in particular less than 1 wt. %.

Independently of the method of preparation chosen, starting components A) in the process according to the invention have a content of uretdione groups of 10 to 25 wt. %, preferably 12 to 23 wt. %, in particular 14 to 20 wt. %, and an average functionality of 2.1 to 2.7, preferably 2.1 to 2.5, in particular 2.1 to 2.3.

Preferred starting compounds A) are uretdione and isocyanurate and/or biuret group-containing polyisocyanate mixtures prepared from diisocyanates with aliphatically and/or cycloaliphatically bonded isocyanate groups of the type mentioned above or mixtures of these. The use of uretdione and isocyanurate group-containing polyisocyanate mixtures prepared from HDI and/or IPDI are particularly preferred.

The use of derivatives of pure IPDI prepared by trialkylphosphine catalysis as the only starting compound A) is excluded from the process according to the invention.

Other diisocyanates B) may optionally also be used in the process according to the invention. These include the diisocyanates suitable for preparing starting compounds A) as described above with aliphatically, cycloaliphatically, aralphatically and/or aromatically bonded isocyanate groups. These diisocyanates B), if present at all, are used in amounts of up to 10 wt. %, preferably up to 5 wt. %, based on the total weight of components A) and B). Preferred diisocyanates B) are diisocyanates with cycloaliphatically bonded isocyanate groups. The use of 1-isocyanato-3,3,5-trimethyl-5-isocyantomethylcyclohexane and/or 4,4'-diisocyantodicyclohexylmethane is particularly preferred.

Suitable ester and/or carbonate group-containing polyhydroxyl compounds C) have an number-average molecular weight, calculated from the functionality and hydroxyl value, of 134 to 2000, preferably 176 to 1200, and an average OH-functionality of 2.0 to 4.0, preferably 2.0 to 3.0. These include known ester alcohols or ester alcohol mixtures, such as those prepared, for example, by reacting polyhydric alcohols with less than stoichiometric amounts of polyvalent carboxylic acids, the corresponding carboxylic anhydrides or the corresponding polycarboxylates of lower alcohols or lactones. Neopentylglycol hydroxypivalate is excluded from the process according to the invention.

Polyhydric alcohols suitable for preparing these ester alcohols include those having a molecular weight of 62 to 400 such as 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)-biscyclohexanol, 1,2,3-propanetriol, 1,1,1-trimethylolethane, 1,2,6-hexanetriol, 1,1,1-trimethylolpropane, 2,2-bis-(hydroxymethyl)-1,3-propanediol or 1,3,5-tris-(2-hydroxyethyl)-isocyanurate.

The acids or acid derivatives used to prepare the ester alcohols may be aliphatic, cycloaliphatic, aromatic and/or heteroaromatic and may optionally be substituted, e.g. by halogen atoms, and/or be unsaturated. Examples of suitable acids include polyvalent carboxylic acids having a molecular weight of 118 to 300 or their derivatives such as succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, dimethyl terephthalate and bisglycol esters of terephthalic acid.

Mixtures of the starting compounds mentioned by way of example may also be used to prepare the ester alcohols. Furthermore, it is possible to use mixtures of different ester alcohols of the type mentioned in the process according to the invention.

Preferred esterpolyols C) are preferably those which can be prepared by ring-opening in known manner from lactones and simple polyhydric alcohols.

Suitable lactones for preparing these esterpolyols include β-propiolactone, γ-butyrolactone, δ-valerolactone, ε-caprolactone, 3,5,5- and 3,3,5-trimethylcaprolactone or any mixture of such lactones. The polyhydric alcohols with a molecular weight of 62 to 400 mentioned above or any mixture of these alcohols may be used as starter molecules.

Particularly preferred ester group-containing polyhydroxyl compounds C) are esterdiols, in particular those based on ε-caprolactone.

Starting compounds C) for the process according to the invention also include carbonate group-containing polyhydroxyl compounds. These can be obtained, for example, by reacting the polyhydric alcohols with a molecular weight of 62 to 400 with diaryl carbonates such as diphenyl carbonate, phosgene or preferably cyclic carbonates such as trimethylene carbonate or 2,2-dimethyl-trimethylene carbonate (neopentylglycol carbonate, NPC) or mixtures of such cyclic carbonates. Particularly preferred carbonate alcohols are those which can be prepared from the polyhydric, in particular dihydric, alcohols mentioned above as starter molecules and NPC, with ring opening.

Starting compounds C) containing both ester and carbonate groups are also suitable for the process according to the invention. Such ester carbonate alcohols can be prepared, for example, in accordance with the disclosure in DE-A 17 70 245 by reacting the polyhydric alcohols with a molecular weight of 62 to 400 with lactones of the type mentioned above, in particular ε-caprolactone and then reacting the ester alcohol prepared in this way with diphenyl carbonate. Ester carbonate alcohols obtained by reacting the polyhydric alcohols with mixtures of lactones and cyclic carbonates, with ring opening, however, are preferably used.

Preparation of the previously described ester alcohols, carbonate alcohols and ester carbonate alcohols by ring-opening polymerization is generally performed in the presence of catalysts including Lewis or Brönsted acids or organic tin or titanium compounds at temperatures of 20 to 200° C., preferably 50 to 160° C.

Mixtures of the ester alcohols, carbonate alcohols and ester carbonate alcohols mentioned by way of example may also be used as starting component C) in the process according to the invention.

Ester and carbonate group-free polyhydroxyl compounds D) with a molecular weight of 62 to 400 may optionally be used in the process according to the invention. These include the polyhydric alcohols mentioned above or any mixture of these alcohols. Ester and carbonate group-free alcohols D), if used at all, are used in amounts of up to 70 wt. %, based on the total amount of starting components C) and D). Mixtures of starting components C) and D) result, for example, when the polyhydric alcohols are converted into polyhydroxyl compounds with less than stoichiometric amounts of acids or acid derivatives, diaryl carbonates or cyclic carbonates or phosgene.

Other monofunctional compounds E) reactive with isocyanate groups may also optionally be used in the process according to the invention. These include aliphatic or cycloaliphatic monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols and hydroxymethylcyclohexane; ether alcohols such as 2-methoxyethanol, 2-ethoxyethanol, 2-propoxyethanol, 2-butoxyethanol, diethylene glycol monomethyl ether, diethylene glycol monoethyl ether, diethylene glycol monobutyl ether, 3-methoxy-1-butanol and glycerine-1,3-diethyl ether; and ester alcohols such as hydroxyethyl acetate, butyl glycolate, ethyl lactate, glycerine diacetate or those which can be obtained by reacting the monoalcohols mentioned with lactones.

Monofunctional compounds E) are optionally used in amounts of up to 20 wt. %, preferably up to 15 wt. %, based on the total weight of starting compounds C), D) and E).

Preferred starting compounds E) for the process according to the invention include aliphatic or cycloaliphatic monoalcohols.

To perform the process according to the invention, uretdione group-containing polyisocyanate mixtures A) and optionally other diisocyanates B) are reacted with ester and/or carbonate group-containing polyhydroxyl compounds C) and optionally other ester and carbonate group-free polyhydroxyl compounds D) and optionally monofunctional compounds E), in an equivalent ratio of isocyanate groups to isocyanate-reactive groups of 1.2:1 to 1.8:1, preferably 1.25:1 to 1.6:1, at a reaction temperature of 40 to 200° C., in particular 60 to 180° C., preferably until reaching the theoretically calculated NCO-content.

The type and ratio by weights of the starting components are chosen such that the resulting polyaddition compounds correspond to the data specified above under a) to d) wherein (a) the polyaddition compounds preferably have an average functionality of 2.3 to 6.0, in particular 2.5 to 5.0 and a concentration of free isocyanate groups of preferably 2.2 to 5.0 wt. %, in particular 2.4 to 4.0 wt. %, (b) the concentration of uretdione groups is preferably 11 to 17 wt. %, in particular 12 to 16 wt. %, (c) the concentration of urethane groups is preferably 12 to 19 wt. %, in particular 14 to 18 wt. %, and (d) the concentration of ester and/or carbonate groups is preferably 2 to 12 wt. %, in particular 3 to 10 wt. %. The polyaddition compounds are solid below 40° C. and liquid above 125° C., in particular having a melting point or melting range, determined by differential thermal analysis (DTA), which is 40 to 110° C., in particular 50 to 100° C.

Uretdione group-containing polyaddition products according to the invention are characterized by very low melt viscosities at temperatures which are only slightly above their melting point or melting range. They can thus be prepared very easily in the molten state at temperatures below the temperature at which the uretdione groups break apart. Although the isocyanate components are used in a molar excess with respect to the polyol components in the process according to the invention, nevertheless the process products according to the invention are generally produced with very low concentrations of monomers, i.e. with concentrations of monomeric diisocyanates of generally less than 1.0 wt. %, preferably less than 0.5 wt. %, in particular less than 0.3 wt. %.

If sufficiently short reaction times, for example less than 5 minutes, are maintained and/or special equipment such as e.g. intensive compounders or static mixers are used, the reaction may also be performed at temperatures in the range where the uretdione structure breaks apart. No great increase in the amount of monomeric diisocyanates is observed.

The reaction may also optionally be performed in a suitable solvent inert to isocyanate groups. Suitable solvents for this less preferred mode of operation include known solvents such as ethyl acetate, butyl acetate, ethylene glycol monomethyl or monoethyl ether acetate, 1-methoxypropyl-2-acetate, 2-butanone, 4-methyl-2-pentanone, cyclohexanone, toluene or mixtures of these. Other useful solvents include propylene glycol diacetate, diethylene glycol dimethyl ether, diethylene glycol ethyl and butyl ether acetate, N-methylpyrrolidone and N-methylcaprolactam or mixtures of such solvents.

These solvents are separated from the products according to the invention, after completion of the reaction, by suitable methods including precipitation and simple suction, spray drying or melt extrusion in an evaporating screw.

To accelerate the urethanization reaction, conventional catalysts known from polyurethane chemistry may be used in the process according to the invention including tert. amines such as triethylamine, pyridine, methylpyridine, benzyldimethylamine, N,N-endoethylenepiperazine, N-methylpiperidine, pentamethyldiethylenetriamine, N,N-dimethylamino-cyclohexane, and N,N'-dimethylpiperazine; or metal salts such as iron(III) chloride, zinc chloride, zinc 2-ethylcaproate, tin(II) octoate, tin(II) ethylcaproate, tin(II) palmitate, dibutyltin (IV) dilaurate and molybdenum glycolate.

These catalysts may optionally be used in amounts of 0.001 to 2.0 wt. %, preferably 0.01 to 0.2 wt. %, based on the total amount of starting compounds used.

The polyaddition compounds according to the invention are valuable starting materials for preparing polyurethane plastics by the isocyanate polyaddition process. They are used in particular as cross-linking components in heat-curable blocking agent-free PUR powder coatings.

Suitable reaction partners for polyaddition compounds according to the invention are the known binders of powder coating technology with isocyanate-reactive groups such as hydroxyl, carboxyl, amino, thiol, urethane or urea groups. Hydroxy-functional powder coating binders which are solid below 40° C. and liquid above 130° C. are preferably used. The softening temperatures of these hydroxy-functional resins, determined by differential thermal analysis (DTA), are preferably 30 to 120° C., in particular 35 to 110° C.

Their hydroxyl values are between 20 and 200, preferably between 30 and 130 and their number average (calculated from the functionality and the hydroxyl content) molecular weight is generally between 400 and 10,000, preferably between 1000 and 5000.

Examples of powder coating binders include hydroxyl group-containing polyesters, polyacrylates or polyurethanes described in EP-A 45 998 or EP-A 254 152, and mixtures of these types of resins.

To prepare a ready-to-use powder coating composition, the polyaddition compounds according to the invention are mixed with suitable hydroxy-functional powder coating binders. Other additives that can optionally be mixed in, include catalysts, pigments, fillers or flow control agents. The mixture is combined to produce a homogeneous material, for example in extruders or compounders, at a temperature above the melting range of the individual components, for example 70 to 130° C., preferably 70 to 110° C.

The polyaddition compounds according to the invention and the hydroxy-functional binders are used in amounts such that 0.6 to 1.4, preferably 0.8 to 1.2 isocyanate groups are present to each hydroxyl group. The amount of isocyanate groups in polyaddition compounds according to the invention is understood to be the sum of the isocyanates present in dimeric form as uretdione groups and the free isocyanate groups.

The optionally used catalysts for accelerating curing include the conventional compounds known from polyurethane chemistry, such as those described above for accelerating the reaction in the process according to the invention. Other catalysts include amidines such as e.g. 1,5-diazabicyclo[4.3.0]non-5-ene (DBN), 1,8-diazabi-cyclo[5.4.0]undec-7-ene (DBU) and 1,2-dimethyl-tetrahydropyrimidine, which, according to the disclosure in EP-A 803 524, are particularly suitable catalysts for lowering the stoving temperature of uretdione powder coating cross-linking agents. These catalysts may optionally be added in amounts of 0.01 to 5.0 wt. %, preferably 0.05 to 2.0 wt. %, based on the total amount of organic binder, i.e. the polyaddition compounds according to the invention in combination with the hydroxy-functional powder coating binder, but excluding the optional additives.

Under the conditions of powder coating preparation, the free isocyanate groups in polyaddition compounds according to the invention react virtually completely, as shown by IR spectroscopy. The isocyanate-free solid resulting after cooling down the molten material is then milled and the proportion of particles with particle sizes above those required, for example above 0.1 mm, are removed by sieving.

The ready-to-spray powder coating composition prepared in this way can be applied onto the superheated substrate by conventional powder application processes including electrostatic powder spraying or fluidized bed coating. According to the invention, any heat-resistant substrates, including those made of metals, wood or glass, may be coated.

Curing the coating is performed by heating to temperatures of 110 to 220° C., preferably 130 to 200° C., for example for a period of about 10 to 30 minutes. Hard and elastic surface coatings with good solvent and chemical resistance, characterized by outstanding flow behavior and a very high gloss, are obtained.

EXAMPLES

In the following, all percentage data, with the exception of gloss values, are given by weight.

Starting Compounds A)
Polyisocyanate A1)

A uretdione polyisocyanate based on 1-isocyanato-3,3,5-trimethyl-5-isocyanatomethylcyclohexane (IPDI) prepared as described in example 3 of EP-A-896 973, (=U.S. Pat. No. 604,332), with a concentration of free isocyanate groups of 16.7%, a concentration of monomeric IPDI of 0.4%, an average NCO-functionality of 2.0, a viscosity (according to DIN 53 018) of more than 200,000 mPas (23° C.) and a concentration of uretdione groups (determined by hot titration) of 20.9%.
Polyisocyanate A2)

A uretdione and isocyanurate group-containing polyisocyanate based on 1,6-diisocyanatohexane (HDI) prepared in the same way as described in example 1-a of EP-A-377 177 (=U.S. Pat. No. 4,994,541), with a concentration of free isocyanate groups of 21.8%, a concentration of monomeric HDI of 0.3%, an average NCO-functionality of 2.5, a viscosity (according to DIN 53 018) of 170 mPas (23° C.) and a concentration of uretdione groups (determined by hot titration) of 15.3%.
Polyisocyanate A3)

A uretdione and isocyanurate group-containing polyisocyanate based on IPDI prepared as described in example 5 of EP-A 45 995 (=U.S. Pat. No. 4,476,054), with a concentration of free isocyanate groups of 17.2%, a concentration of monomeric IPDI of 0.9%, an average NCO-functionality of 2.2, a viscosity (according to DIN 53 018) of more than 200,000 mPas (23° C.) and a concentration of uretdione groups (determined by hot titration) of 15.4%.
Polyisocyanate A4)

An isocyanurate-polyisocyanate based on HDI as described of example 7 in EP-A 330 966, with a concentration of free isocyanate groups of 21.8%, a concentration of monomeric HDI of 0.1%, an average NCO-functionality of 3.5 and a viscosity (according to DIN 53 018) of 3500 mPas (23° C.).
Polyisocyanate A5)

A biuret-polyisocyanate based on HDI prepared as described in example 3 of EP-A 277 353 (=U.S. Pat. No. 4,837,359), with a concentration of free isocyanate groups of 22.0%, a concentration of monomeric HDI of 0.2%, an average NCO-functionality of 4.0 and a viscosity (according to DIN 53 018) of 11,000 mPas (23° C.).
Polyisocyanate A6)

A isocyanurate-polyisocyanate based on IPDI prepared in a solvent-free manner as described in example 1 of EP-A 3 765 (=U.S. Pat. No. 4,288,586), with a concentration of free isocyanate groups of 16.4%, a concentration of monomeric IPDI of 0.2%, an average NCO-functionality of 3.4 and a melting range of 100–105° C.

Preparing Starting Compounds C
Ester Group-containing Diol C1)

620 g of 1,2-ethanediol and 1712 g of ε-caprolactone were mixed at room temperature under dry nitrogen, 0.3 g of tin(II) octoate were added and the mixture was then heated at 160° C. for 5 h. After cooling to room temperature, a colorless liquid product with the following characteristics was obtained:

η(23° C.): 150 mPas
OH value: 476 mg KOH/g
free ε-caprolactone: 0.5%
average mol. wt. (calc. from the OH value): 235
ester group content (calc.): 28.1%

Ester Group-containing Diol C2)

761 g of 1,3-propanediol and 1712 g of ε-caprolactone were mixed at room temperature under dry nitrogen, 0.3 g of tin(II) octoate were added and the mixture was then heated at 160° C. for 5 h. After cooling to room temperature, a colorless liquid product with the following characteristics was obtained:

η(23° C.): 190 mPas
OH value: 449 mg KOH/g
free ε-caprolactone: 0.3%
average mol. wt. (calc. from the OH value): 249
ester group content (calc.): 26.7%

Ester Group-containing Diol C3)

901 g of 1,4-butanediol and 1712 g of ε-caprolactone were mixed at room temperature under dry nitrogen, 0.3 g of tin(II) octoate were added and the mixture was then heated at 160° C. for 5 h. After cooling to room temperature, a colorless liquid product with the following characteristics was obtained:

η(23° C.): 180 mPas
OH value: 416 mg KOH/g
free ε-caprolactone: 0.1%
average mol. wt. (calc. from the OH value): 269
ester group content (calc.): 25.3%

Ester Group-containing Triol C4)

1341 g of 1,1,1-trimethylolpropane (TMP) and 1712 g of ε-caprolactone were mixed at room temperature under dry nitrogen, 0.3 g of tin(II) octoate were added and the mixture was then heated at 160° C. for 5 h. After cooling to room temperature, a colorless liquid product with the following characteristics was obtained:

η(23° C.): 2400 mPas
OH value: 546 mg KOH/g
free ε-caprolactone: 0.2%
average mol. wt. (calc. from the OH value): 308
ester group content (calc.): 21.6%

Carbonate Group-containing Diol C5)

901 g of 1,4-butanediol and 1300 g of NPC were mixed at room temperature under dry nitrogen, 0.2 g of orthophosphoric acid were added and the mixture was then heated at 160° C. for 8 h. After cooling to room temperature, a virtually colorless liquid product with the following characteristics was obtained:

η(23° C.): 1500 mPas
OH value: 519 mg KOH/g
free ε-caprolactone: 0.5%
average mol. wt. (calc. from the OH value): 216
ester group content (calc.): 20.0%

EXAMPLES

Example 1

650 g (2.58 g.equiv.) of uretdione group-containing polyisocyanate A1) were mixed with 350 g (1.82 g.equiv.) of uretdione group-containing polyisocyanate A2) at 50° C. under dry nitrogen, 0.1 g of dibutyltin (IV) dilaurate (DBTL) was added as catalyst and the mixture was heated to 80° C. To this mixture, which had a concentration of uretdione groups of 18.9% and an average NCO functionality of 2.18, was added over the course of 20 minutes a mixture of 207 g (1.76 g.equiv.) of ester group-containing diol C1) and 55 g (1.77 g. equiv.) of 1,2-ethanediol and the mixture was stirred at a maximum reaction temperature of 104° C. until the NCO content of the reaction mixture fell, after about 20 min, to a value of 2.9%. The molten material was poured onto a sheet of metal to cool and the polyaddition compound according to the invention was obtained as a pale yellow solid resin with the following characteristics:

NCO content (found/calculated): 2.9/2.9%
Uretdione group content (calc.): 15.0%
NCO content, total (calc.): 17.9%
NCO functionality: 3.4
monomeric IPDI: 0.36%
monomeric HDI: <0.03%
Melting range: 79–84° C.
Ester group content (calc.): 4.6%
Urethane group content (calc.): 16.5%

Example 2

750 g (2.98 g.equiv.) of uretdione group-containing polyisocyanate A1) were mixed with 250 g (1.30 g.equiv.) of uretdione group-containing polyisocyanate A2) at 50° C. under dry nitrogen, 0.1 g of dibutyltin (IV) dilaurate (DBTL) was added as catalyst and the mixture was heated to 80° C. To this mixture, which had a concentration of uretdione groups of 19.5% and an average NCO functionality of 2.13, was added over the course of 20 minutes a mixture of 201 g (1.71 g.equiv.) of ester group-containing diol C1) and 53 g (1.71 g. equiv.) of 1,2-ethanediol and the mixture was stirred at a maximum reaction temperature of 109° C. until the NCO content of the reaction mixture fell, after about 20 min, to a value of 3.0%. The molten material was poured onto a sheet of metal to cool and the polyaddition compound according to the invention was obtained as a pale yellow solid resin with the following characteristics:

NCO content (found/calculated): 3.0/2.9%
Uretdione group content (calc.): 15.2%
NCO content, total (calc.): 17.1%
NCO functionality: 2.9
monomeric IPDI: 0.22%
monomeric HDI: <0.03%
Melting range: 76–83° C.
Ester group content (calc.): 4.5%
Urethane group content (calc.): 16.1%

Example 3

900 g (3.58 g.equiv.) of uretdione group-containing polyisocyanate A1) were mixed with 100 g (0.52 g.equiv.) of isocyanurate-polyisocyanate A4) at 50° C. under dry nitrogen, 0.1 g of dibutyltin (IV) dilaurate (DBTL) was added as catalyst and the mixture was heated to 80° C. To this mixture, which had a concentration of uretdione groups of 18.8% and an average NCO functionality of 2.12, was added over the course of 20 minutes a mixture of 221 g (1.64 g.equiv.) of ester group-containing diol C3) and 74 g (1.64 g. equiv.) of 1,4-butanediol and the mixture was stirred at a maximum reaction temperature of 111° C. until the NCO content of the reaction mixture fell, after about 20 min, to a value of 2.8%. The molten material was poured onto a sheet of metal to cool and the polyaddition compound according to the invention was obtained as a pale yellow solid resin with the following characteristics:

NCO content (found/calculated): 2.8/2.7%
Uretdione group content (calc.): 14.5%
NCO content, total (calc.): 17.2%
NCO functionality: 2.8
monomeric IPDI: 0.31%
monomeric HDI: <0.03%
Melting range: 83–88° C.
Ester group content (calc.): 4.3%
Urethane group content (calc.): 14.9%

Example 4

900 g (3.58 g.equiv.) of uretdione group-containing polyisocyanate A1) were mixed with 100 g (0.52 g.equiv.) of biuret-polyisocyanate A5) at 50° C. under dry nitrogen, 0.1 g of dibutyltin (IV) dilaurate (DBTL) was added as catalyst and the mixture was heated to 80° C. To this mixture, which had a concentration of uretdione groups of 18.8% and an average NCO functionality of 2.14, was added over the course of 20 minutes a mixture of 204 g (1.64 g.equiv.) of ester group-containing diol C2) and 62 g (1.63 g. equiv.) of 1,3-propanediol and the mixture was stirred at a maximum reaction temperature of 106° C. until the NCO content of the reaction mixture fell, after about 20 min, to a value of 3.0%. The molten material was poured onto a sheet of metal to cool and the polyaddition compound according to the invention was obtained as a pale yellow solid resin with the following characteristics:

NCO content (found/calculated): 3.0/2.8%
Uretdione group content (calc.): 14.8%
NCO content, total (calc.): 17.6%
NCO functionality: 2.9
monomeric IPDI: 0.29%
monomeric HDI: <0.03%
Melting range: 81–87° C.
Ester group content (calc.): 4.1%
Urethane group content (calc.): 15.2%

Example 5

700 g (2.78 g.equiv.) of uretdione group-containing polyisocyanate A1) were mixed with 300 g (1.17 g.equiv.) of powdered isocyanurate-polyisocyanate A6) at 60° C. under dry nitrogen, 0.1 g of dibutyltin (IV) dilaurate (DBTL) was added as catalyst and the mixture was heated to 80° C. To this mixture, which had a concentration of uretdione groups of 14.6% and an average NCO functionality of 2.28, was added over the course of 20 minutes a mixture of 197 g (1.58 g.equiv.) of ester group-containing diol C2) and 60 g (1.58 g. equiv.) of 1,3-propanediol and the mixture was stirred at a maximum reaction temperature of 121° C. until the NCO content of the reaction mixture fell, after about 15 min, to a value of 3.0%. The molten material was poured onto a sheet of metal to cool and the polyaddition compound according to the invention was obtained as a light yellow solid resin with the following characteristics:

NCO content (found/calculated): 3.0/2.6%
Uretdione group content (calc.): 11.6%
NCO content, total (calc.): 14.2%
NCO functionality: 5.3
monomeric IPDI: 0.43%
monomeric HDI: <0.03%
Melting range: 113–119° C.
Ester group content (calc.): 4.2%
Urethane group content (calc.): 14.8%

Example 6

850 g (3.48 g.equiv.) of uretdione and isocyanurate group-containing polyisocyanate A3) were mixed with 150 g (0.78 g.equiv.) of uretdione and isocyanurate group-containing polyisocyanate A2) at 50° C. under dry nitrogen, 0.1 g of dibutyltin (IV) dilaurate (DBTL) was added as catalyst and the mixture was heated to 80° C. To this mixture, which had a concentration of uretdione groups of 15.3% and an average NCO functionality of 2.25, was added over the course of 20 minutes a mixture of 212 g (1.70 g.equiv.) of ester group-containing diol C2) and 65 g (1.71 g.equiv.) of 1,3-propanediol and the mixture was stirred at a maximum reaction temperature of 106° C. until the NCO content of the reaction mixture fell, after about 15 min, to a value of 2.9%. The molten material was poured onto a sheet of metal to cool and the polyaddition compound according to the invention was obtained as a light yellow solid resin with the following characteristics:

NCO content (found/calculated): 2.9/2.8%
Uretdione group content (calc.): 12.0%
NCO content, total (calc.): 14.8%
NCO functionality: 4.5
monomeric IPDI: 0.30%
monomeric HDI: <0.03%
Melting range: 80–88° C.
Ester group content (calc.): 4.4%
Urethane group content (calc.): 15.8%

Example 7

750 g (2.98 g.equiv.) of uretdione group-containing polyisocyanate A1) were mixed with 250 g (1.30 g.equiv.) of uretdione group-containing polyisocyanate A2) at 50° C. under dry nitrogen, 0.1 g of dibutyltin (IV) dilaurate (DBTL) was added as catalyst and the mixture was heated to 80° C. To this mixture, which had a concentration of uretdione groups of 19.5% and an average NCO functionality of 2.13, was added over the course of 20 minutes a mixture of 185 g (1.71 g.equiv.) of carbonate group-containing diol C5) and 77 g (1.71 g. equiv.) of 1,4-butanediol and the mixture was stirred at a maximum reaction temperature of 107° C. until the NCO content of the reaction mixture fell, after about 20 min, to a value of 2.9%. The molten material was poured onto a sheet of metal to cool and the polyaddition compound according to the invention was obtained as a faintly yellow solid resin with the following characteristics:

NCO content (found/calculated): 2.9/2.8%
Uretdione group content (calc.): 15.5%
NCO content, total (calc.): 17.7%
NCO functionality: 2.9
monomeric IPDI: 0.29%
Melting range: 80–86° C.
Carbonate group content (calc.): 2.9%
Urethane group content (calc.): 16.0%

Example 8

900 g (3.58 g.equiv.) of uretdione group-containing polyisocyanate A1) were mixed with 100 g (0.52 g.equiv.) of isocyanurate-polyisocyanate A4) at 50° C. under dry nitrogen, 0.1 g of dibutyltin (IV) dilaurate (DBTL) was added as catalyst and the mixture was heated to 80° C. To this mixture, which had a concentration of uretdione groups of 18.8% and an average NCO functionality of 2.12, was added over the course of 20 minutes a mixture of 126 g (0.82 g.equiv.) of ester group-containing triol C4), 167 g (1.24 g.equiv.) of ester-group containing diol C3) and 56 g (1.24 g.equiv.) of 1,4-butanediol and the mixture was stirred at a maximum reaction temperature of 113° C. until the NCO content of the reaction mixture fell, after about 15 min, to a value of 2.8%. The molten material was poured onto a sheet of metal to cool and the polyaddition compound according to the invention was obtained as a light yellow solid resin with the following characteristics:

NCO content (found/calculated): 2.8/2.5%
Uretdione group content (calc.): 14.0%
NCO content, total (calc.): 16.5%
NCO functionality: 5.3
monomeric IPDI: 0.41%
monomeric HDI: <0.03%
Melting range: 87–94° C.
Ester group content (calc.): 5.1%
Urethane group content (calc.): 14.4%

Example 9
(Comparison)

650 g (2.58 g.equiv.) of uretdione group-containing polyisocyanate A1) were mixed with 350 g (1.82 g.equiv.) of uretdione group-containing polyisocyanate A2) at 50° C. under dry nitrogen, 0.1 g of dibutyltin (IV) dilaurate (DBTL) was added as catalyst and the mixture was heated to 80° C. To this mixture, which had a concentration of uretdione groups of 18.9% and an average NCO functionality of 2.18, was added over the course of 30 minutes 158 g (3.51 g. equiv.) of 1,4-butanediol. Even during addition of the diol, the temperature of the heating bath had to be increased to 135° C. in order to maintain the capacity to stir, due to the rapid increase in viscosity of the reaction mixture. After 10 min, the NCO content of the reaction mixture was 4.1%. After 20 min, the temperature of the reaction mixture had increased to 158° C., despite the external temperature remaining at 135° C., under the effect of the shear forces occurring during stirring as a result of the still increasing viscosity. The NCO content rose to 5.2% and did not fall again even after a relatively long reaction time. The concentration of monomeric IPDI was 1.9%.

Example 10
(Comparison)

650 g (2.58 g.equiv.) of uretdione group-containing polyisocyanate A1) were mixed with 350 g (1.82 g.equiv.) of uretdione group-containing polyisocyanate A2) at 50° C. under dry nitrogen, 0.1 g of dibutyltin (IV) dilaurate (DBTL) was added as catalyst and the mixture was heated to 80° C. To this mixture, which had a concentration of uretdione groups of 18.9% and an average NCO functionality of 2.18, was added, over the course of 30 minutes and in portions, 358 g (3.51 g.equiv.) of neopentylglycol hydroxypivalate. The temperature of the heating bath had to be increased to 130° C. towards the end of diol addition due to the greatly increasing viscosity of the reaction mixture, in order to ensure the ability to be stirred. After 15 min, the NCO content of the reaction mixture was 3.5%. After 20 min, the temperature of the reaction mixture had increased to 151° C., despite the external temperature remaining at 135° C., under the effect of the shear forces occurring during stirring as a result of the still increasing viscosity. The NCO content rose to 4.2% and did not fall again even after a relatively long reaction time. The concentration of monomeric IPDI was 1.4%.

Comparison examples 9 and 10 show that the uretdione group breaks open to a considerable extent during the reaction of branched uretdione group-containing polyisocyanate mixtures with simple diols or neopentylglycol hydroxypivalate in the molten state in accordance with the process described in example 1. The NCO contents of 3.2% (example 9) and 2.8% (example 10), respectively, which were desired were not achieved and the concentrations of monomeric diisocyanate clearly exceeded the limit of 1%.

Example 11
(Comparison)

650 g (2.58 g.equiv.) of uretdione group-containing polyisocyanate A1) and 350 g (1.82 g.equiv.) of uretdione group-containing polyisocyanate A2) were initially introduced into 1358 g of anhydrous toluene at 80° C. under dry nitrogen, with 0.1 g of dibutyltin (IV) dilaurate (DBTL) as catalyst. To this solution, which had a concentration of uretdione groups of 8.0%, was added, over the course of 30 min and in portions, 358 g (3.51 g.equiv.) of neopentylglycol hydroxypivalate and the mixture was stirred at a reaction temperature of 100° C. until the NCO content fell to a value of 1.4%. The solvent was then completely removed from the yellowish solution obtained, by spray drying in a commercially available laboratory spray dryer, a Mini-spray Dryer 190 (Büchi). A light yellow product with the following characteristics was obtained:

NCO content (found/calculated): 2.7/2.7%
Uretdione group content (calc.): 13.9%
NCO content, total (calc.): 16.6%
NCO functionality: 3.4
monomeric IPDI: 0.15%
monomeric HDI: <0.03%
Melting range: 97–101° C.
Ester group content (calc.): 5.7%
Urethane group content (calc.): 15.2%

Example 12
(Use)

55.1 parts by wt. of a commercially available hydroxyl group-containing polyester (Crylcoat 240; UCB Chemicals) with an OH value of 30 were thoroughly mixed with 6.9 parts by wt. of the polyaddition compound according to the invention from example 1, in accordance with an equivalent ratio of total NCO to OH of 1:1, 1.5 parts by wt. of a commercially available flow control agent (Modaflow Powder III; Solutia), 1.0 part by wt. of tin(II) palmitate as catalyst, 0.5 parts by wt. of benzoin and 35.0 parts by wt. of a white pigment (Kronos 2160; Kronos Titan) and then homogenized with the aid of a Buss co-compounder of the PLK 46 type at 100 rpm and with a housing temperature of 100 to 120° C. in the processing section. After cooling, the solidified melt was milled and screened with the aid of a screening mill ACM 2 (Hosokawa Mikropul) with a 90 μm sieve. The resulting powder, which no longer contained any free isocyanate groups according to IR spectroscopy, was sprayed onto a degreased sheet of steel with an ESB cup-gun at a high voltage of 70 kV and cured for 15 min at 180° C.

For comparison, a powder coating was prepared in the same way from 54.6 parts by wt. of the same hydroxyl group-containing polyester and 7.4 parts by wt. of the polyaddition compound obtained in accordance with comparison example 11, 1.5 parts by wt. of a commercially available flow control agent (Modaflow Powder III; Solutia), 1.0 part by wt. of tin(II) palmitate as catalyst, 0.5 parts by wt. of benzoin and 35.0 parts by wt. of a white pigment (Kronos 2160; Kronos Titan), and then sprayed onto a degreased sheet of steel and cured for 15 min at 180° C. The equivalent ratio of total NCO to OH was also 1:1.

The lacquer properties of both coatings were then tested. In addition to gloss and cloudiness values, the orange peel effect, measured with the aid of a Byk-Gardner "wave-scan-plus" instrument, was also taken into account in order to characterize the surface structure. With a layer thickness of about 60 μm the following properties were found:

| Powder coating with polyaddition compound from | Example 1 | Example 11 (comparison) |
|---|---|---|
| Impact (ASTM-D-2794-69) | >80 ip | 10 ip |
| Gloss 60°/20° (DIN 67530) | 98/85 | 89/51 |
| Haze (DIN 67530; ISO 2813) | 46 | 88 |
| Wave scan: | | |
| long wave | 34.5 | 57.2 |
| short wave | 38.2 | 68.4 |
| tension | 10.4 | 6.7 |

The comparison shows that a more fully cross-linked lacquer film was obtained with the aid of the polyaddition compound according to the invention, one which was characterized by much higher elasticity, higher gloss, lower cloudiness and much better flow behavior when compared with the coating which was prepared using the known polyaddition compound from the prior art. While the lacquer film obtained in accordance with the invention flowed out smoothly, the comparison coating exhibited a strong orange peel structure.

Examples 13 to 15

(Use)

White pigmented powder coatings were prepared by the process described in example 12, starting from the hydroxyl group-containing polyester described in example 12 and polyaddition compounds 2, 3 and 6 according to the invention. The finally formulated powder coatings, which in all cases contained no unblocked isocyanate groups, according to IR spectroscopy, were each sprayed onto a degreased sheet of steel using an ESB cup-gun at a high voltage of 70 kV and cured for 15 min at 180° C. The table given below shows the compositions (parts by wt.) of the powder coatings and the data for lacquer properties of the coatings prepared therefrom (thickness of layer about 60 μm each time).

| | Example 13 | Example 14 | Example 15 |
|---|---|---|---|
| Crylcoat 240 polyester | 54.8 | 54.8 | 53.8 |
| Polyaddition compound from: | | | |
| example 2 | 7.2 | — | — |
| example 3 | — | 7.2 | — |
| example 6 | — | — | 8.2 |
| Modaflow Powder III additive | 1.5 | 1.5 | 1.5 |
| Tin(II) palmitate | 1.0 | 1.0 | 1.0 |
| Benzoin | 0.5 | 0.5 | 0.5 |

| | Example 13 | Example 14 | Example 15 |
|---|---|---|---|
| Kronos 2160 pigment | 35.0 | 35.0 | 35.0 |
| Impact (ASTM-D-2794-69) | >80 ip | >80 ip | >80 ip |
| Gloss 60°/20° (DIN 67530) | 102/89 | 103/88 | 102/86 |
| Haze (DIN 67530; ISO 2813) | 51 | 52 | 50 |
| Wave scan: | | | |
| long wave | 28.0 | 33.5 | 42.0 |
| short wave | 33.6 | 42.5 | 46.6 |
| tension | 11.7 | 10.6 | 9.1 |

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A polyaddition compound which is solid below 40° C. and liquid above 125° C. and has
    a) a concentration of free isocyanate groups (calculated as NCO; molecular weight=42) of 2.1 to 6.0 wt. % with an average isocyanate functionality of 2.1 to 8.0,
    b) a concentration of uretdione groups (calculated as $C_2N_2O_2$; molecular weight=84) of 10 to 18 wt. %,
    c) a concentration of urethane groups (calculated as —NH—CO—O; molecular weight=59) of 10 to 20 wt. % and
    d) a concentration of ester groups —CO—O (calculated as —CO—O; molecular weight=44) and/or carbonate groups —O—CO—O (calculated as —CO—O; molecular weight=44) of 1 to 17 wt. %
wherein the uretdione groups are not derived from pure 1-isocyanato-3,3,5-trimethyl-5-isocyantomethylcyclohexane by trialkylphosphine catalysis, and the ester and/or carbonate groups are not derived from neopentylglycol hydroxypivalate.

2. A process for preparing a polyaddition compound which is solid below 40° C. and liquid above 125° C. and has
    a) a concentration of free isocyanate groups (calculated as NCO; molecular weight=42) of 2.1 to 6.0 wt. % with an average isocyanate functionality of 2.1 to 8.0,
    b) a concentration of uretdione groups (calculated as $C_2N_2O_2$; molecular weight=84) of 10 to 18 wt. %,
    c) a concentration of urethane groups (calculated as —NH—CO—O; molecular weight=59) of 10 to 20 wt. % and
    d) a concentration of ester groups —CO—O (calculated as —CO—O; molecular weight=44) and/or carbonate groups —O—CO—O (calculated as —CO—O; molecular weight=44) of 1 to 17 wt. %,
wherein
    A) uretdione group-containing polyisocyanate mixtures with an average NCO functionality of at least 2.1, except for derivatives of pure 1-isocyanato-3,3,5-trimethyl-5-isocyantomethylcyclohexane prepared by trialkylphosphine catalysis, and optionally
    B) other diisocyanates in an amount of up to 10 wt. %, with respect to the total weight of components A) and B),
are reacted with
    C) ester and/or carbonate group-containing polyhydroxyl compounds with an number-average molecular weight of 134 to 2000, except for neopentylglycol hydroxypivalate, and optionally D) other ester and carbonate group-free polyhydroxyl compounds with a molecular weight of 62–400 in an amount of up to 70 wt. %, based on the total weight of components C) and D), and optionally E) other monofunctional compounds which can react with isocyanate groups, in an amount of up to 20 wt. %, based on the total weight of components C), D) and E), at an equivalent ratio of isocyanate groups to isocyanate-reactive groups of 1.2:1 to 1.8:1, wherein the ratios by weight of the starting materials mentioned are chosen in such a way that the resulting process product has the properties a) to d).

3. The process of claim 2, wherein starting compounds A) are uretdione group-containing polyisocyanate mixtures prepared from diisocyanates with aliphatically and/or cycloaliphatically bonded isocyanate groups.

4. The process of claim 2, wherein starting compounds A) are uretdione and isocyanurate group-containing polyisocyanate mixtures prepared from 1,6-diisocyanatohexane and/or 1-isocyanato-3,3,5-trimethyl-5-isocyantomethyl-cyclohexane.

5. The process of claim 2, wherein starting compounds C) are polyesterpolyols prepared by ring-opening polymerization of ε-caprolactone.

6. A coating composition containing as cross-linking component a polyaddition compound which is solid below 40° C. and liquid above 125° C. and has a) a concentration of free isocyanate groups (calculated as NCO; molecular weight=42) of 2.1 to 6.0 wt. % with an average isocyanate functionality of 2.1 to 8.0, b) a concentration of uretdione groups (calculated as $C_2N_2O_2$; molecular weight=84) of 10 to 18 wt. %, c) a concentration of urethane groups (calculated as —NH—CO—O; molecular weight=59) of 10 to 20 wt. % and d) a concentration of ester groups —CO—O (calculated as —CO—O; molecular weight=44) and/or carbonate groups —O—CO—O (calculated as —CO—O; molecular weight=44) of 1 to 17 wt. % wherein the uretdione groups are not derived from pure 1-isocyanato-3,3,5-trimethyl-5-isocyanatomethylcyclohexane by trialkylphosphine catalysis, and the ester and/or carbonate groups are not derived from neopentylglycol hydroxypivalate and a binder of powder coating technology with isocyanate-reactive groups.

* * * * *